US005547569A

United States Patent [19]

Spencer

[11] Patent Number: 5,547,569
[45] Date of Patent: Aug. 20, 1996

[54] MULTIPLE STAGE WATER CLARIFIER

[75] Inventor: Donald R. Spencer, Clay City, Ky.

[73] Assignee: Hinkle Contracting Corporation, Paris, Ky.

[21] Appl. No.: 377,896

[22] Filed: Jan. 25, 1995

[51] Int. Cl.$^6$ .................................................. B01D 21/08
[52] U.S. Cl. .................... 210/206; 210/208; 210/255; 210/305; 210/521; 210/534
[58] Field of Search ............................ 210/202, 206, 210/207, 208, 219, 255, 261, 262, 299, 305, 307, 520, 521, 532.1, 534, 535

[56] References Cited

U.S. PATENT DOCUMENTS

| | | | |
|---|---|---|---|
| 653,009 | 7/1900 | Koyl | 210/208 |
| 2,087,851 | 7/1937 | Darby | 210/208 |
| 3,184,065 | 5/1965 | Bradford | 210/521 |
| 3,341,016 | 9/1967 | Paasche | 210/307 |
| 3,487,017 | 12/1969 | Thorn et al. | 210/208 |
| 3,539,051 | 11/1970 | Stone | 210/520 |
| 3,591,000 | 7/1971 | Humphreys . | |
| 3,615,025 | 10/1971 | Rice et al. | 210/208 |
| 3,640,387 | 2/1972 | Conley et al. . | |
| 3,813,851 | 6/1974 | Eder | 210/521 |
| 4,056,477 | 11/1977 | Ravitts . | |
| 4,132,651 | 1/1979 | deJong . | |
| 4,400,280 | 8/1983 | Larsson . | |
| 4,664,802 | 5/1987 | Lee . | |
| 4,957,628 | 9/1990 | Schulz | 210/521 |
| 5,054,506 | 10/1991 | Shakeri . | |
| 5,089,136 | 2/1992 | Cyr | 210/521 |
| 5,143,625 | 9/1992 | Ballard . | |
| 5,242,604 | 9/1993 | Young et al. . | |
| 5,264,120 | 11/1993 | Graves . | |
| 5,296,149 | 3/1994 | Krofta . | |
| 5,330,643 | 7/1994 | Webb et al. | 210/255 |

OTHER PUBLICATIONS

Terry Eichelberger & Jeffrey Williams, "Crushed Stone Fines Removal With Polymer Gell Logs," *Stone Review*, Dec., 1991, pp. 46–48.

Primary Examiner—Christopher Upton
Attorney, Agent, or Firm—King & Schickli

[57] ABSTRACT

A sloped plate water clarifier is provided with multiple clarifying stages. Slurry enters a feeding and mixing passageway that contains chemical flocculant in the form of polymer gel logs. Agitating drums in the passageway provide controlled mixing of the slurry with the flocculant. At the end of the passageway the slurry flows over a static screen that separates the useable process product from solid refuse. The slurry passing through the screen flows into a settling tank containing sloped plates arranged in three ascending stages, with the plates in the uppermost stage being angularly adjustable. As the slurry rises inside the tank, the sloped plates allow the suspended solids in the slurry to settle and eventually accumulate on the tank bottom for periodic removal, including as an alternative by a venturi pump. The clarified water exits a spillway at the top of the tank.

17 Claims, 3 Drawing Sheets

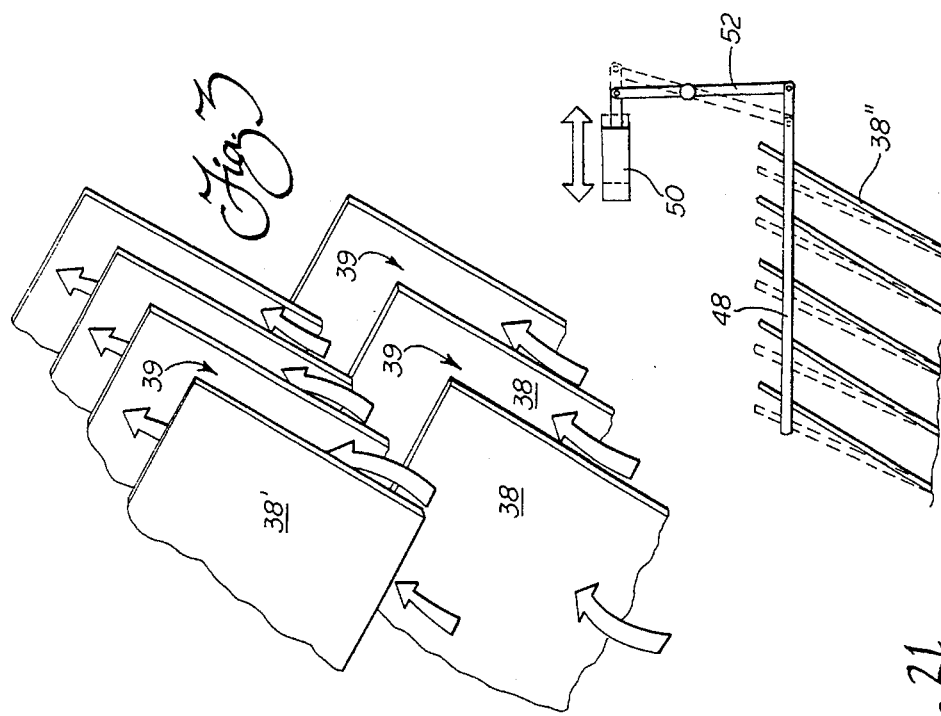
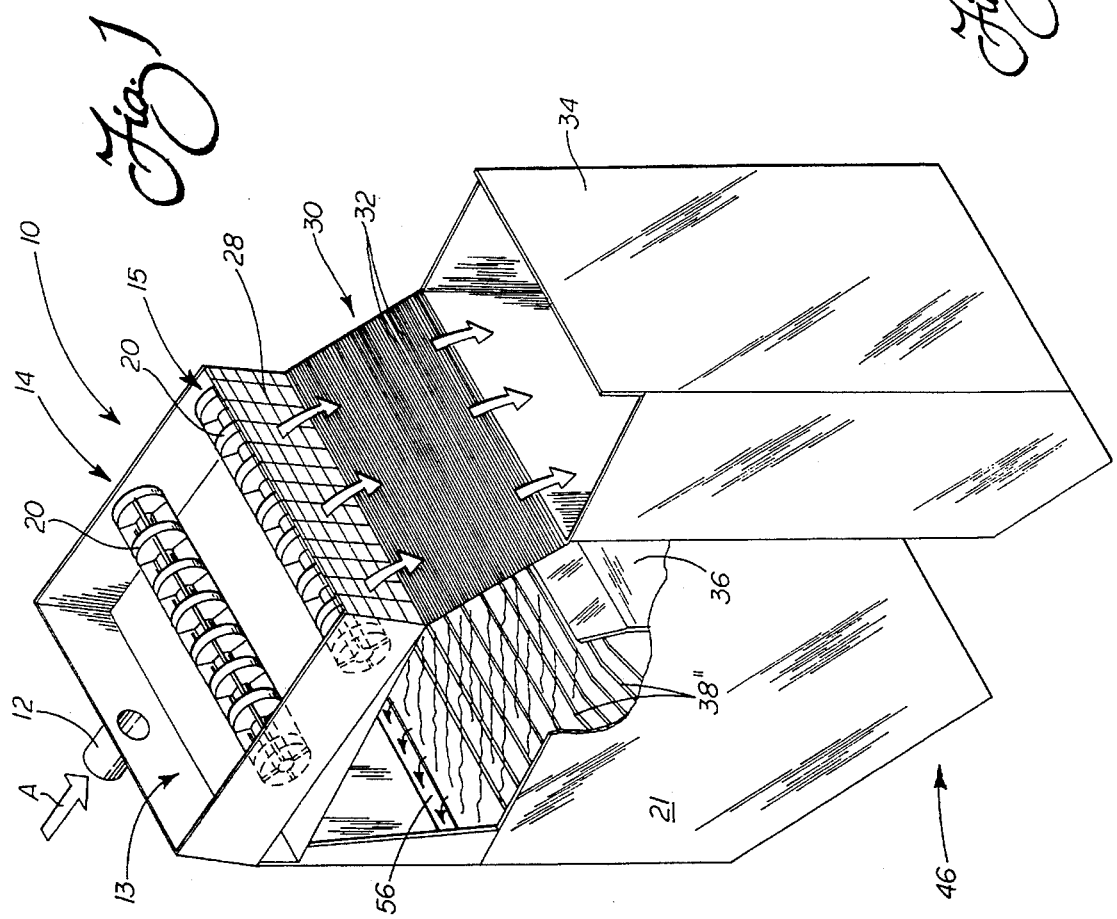

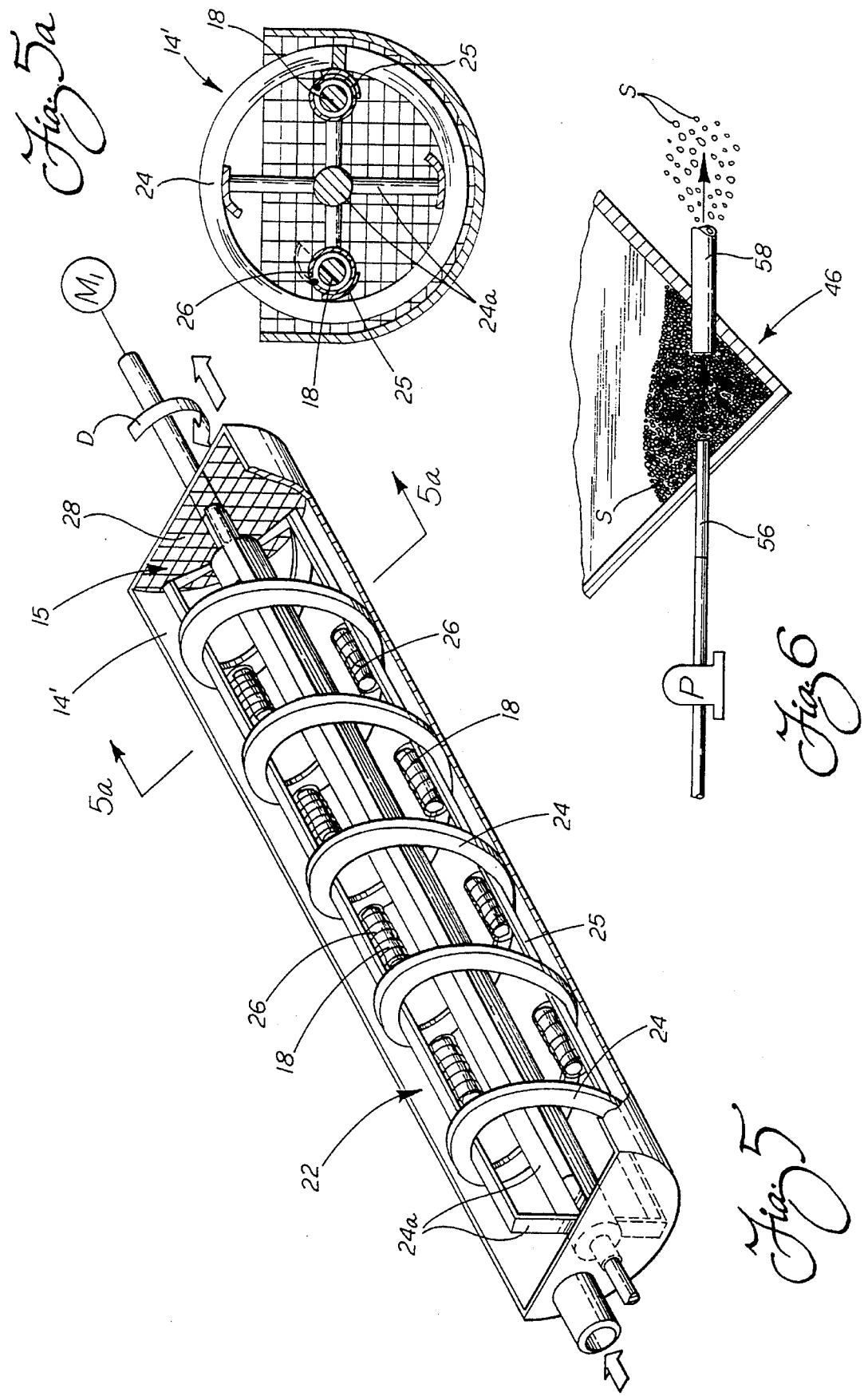

MULTIPLE STAGE WATER CLARIFIER

TECHNICAL FIELD

The present invention relates generally to a sloped plate water clarifier; and more particularly, to an improved multiple stage water clarifier including sloped plates arranged for improved efficiency and control of the clarification process, as well as other features, such as the mechanical mixing of untreated slurry with polymer flocculant.

BACKGROUND OF THE INVENTION

The removal of suspended solids from a water supply is commonly accomplished with several types of sloped plate water clarifiers. In a typical design, the untreated water or slurry is directed into a tank that contains a plurality of parallel, spaced apart plates that are inclined with respect to the horizontal. As the individual particles in the slurry contact the sloped plates, the particles coalesce into larger groups on the surface of the plates. When these groups are heavy enough to lose their buoyancy, they dislodge from the plates and sink downwardly to settle in the bottom of the tank. The clarified water rises in the tank and is discharged near the top. The patents to Larsson et al. U.S. Pat. No. 4,400,280 and Lee U.S. Pat. No. 4,664,802 are examples of sloped plate clarifiers having this basic design.

One area of improvement needed for these clarifiers is in the positioning of the sloped plates inside the tank. Also, in most prior arrangements, the plates are fixedly attached at a particular angle. With this arrangement, the settling process cannot be controlled by varying the slope angle of the plates. This limits the ability of the operator to adjust for changing slurry conditions and operating requirements.

Another problem with the clarifiers of the prior art is that they provide no means for separating and recovering valuable process product from the impurities and other suspended solids in the slurry. In the prior art designs, the untreated slurry is introduced directly into the clarifier tank and any process product in the slurry is collected at the bottom of the tank with the other residue and expelled. Particularly in a quarry or mining operation, the amount of product lost in the clarification process is thus often substantial.

An inherent limitation with all sloped plate clarifiers is that the natural settling process provided can only achieve a certain level of clarification. As the size of the suspended solids in the slurry decreases, the settling characteristics of these solids become poor and the effectiveness of the sloped plate clarifier correspondingly decreases. At a certain point, the desired clarity may be unobtainable or require an unacceptably slow flow rate.

To counter this problem, some clarifiers incorporate chemical flocculants that agglomerate the smaller particles into larger groups that are more easily settled. The most commonly used flocculants are water-soluble copolymers having a very high molecular weight. These polymer flocculants are typically used in a liquid form that is mixed with the untreated slurry at the beginning of the clarification process.

Although the use of polymer flocculants increases the effectiveness of sloped plate clarifiers, it is also a relatively expensive process. Not only is the cost of the polymer flocculant itself substantial, but the capital cost of the equipment required for feeding a liquid flocculant into the system is very expensive, and even considered by some to be cost prohibitive. That is, these systems require a separate tank for storing the liquid polymer and a separate pump station with relatively expensive electronic controls to regulate and monitor the flow of the polymer into the clarifier. In addition, a liquid polymer flocculant system is maintenance intensive and requires regular human intervention and adjustment to achieve the proper level of clarification. An example of a sloped plate clarifier that uses liquid polymer flocculant is U.S. Pat. No. 5,143,625 to Ballard.

A recent development in the field of polymer flocculants is the availability of a concentrated solid form, generally referred to as a polymer gel log. These logs are placed directly in the untreated slurry and gradually dissolve to provide controlled release of polymer flocculant. Coagulation of the suspended solids begins immediately downstream of the logs and settling and precipitation of the suspended solids is substantially improved. An example of this form of polymer flocculant is the Photafloc polymer gel log manufactured by Neutron Products, Inc., Dickerson, Md. 20842.

Using polymer gel logs provides several distinct advantages over liquid polymer. Most importantly, it has been found that by using polymer gel logs in combination with a mechanical mixer to generate turbulence in the flow inlet passageway, the consumption of polymer flocculant is dramatically reduced while still maintaining an effective level of supply to promote settling of the solids. For example, in a stone washing process in a limestone quarry the cost of treating the slurry or washwater with polymer gel logs is determined by testing to be approximately one-tenth the cost of treating the same amount of slurry with liquid polymer. Additionally, using polymer gel logs eliminates the need for separate storage tanks and electronically controlled pumping stations that are required for dispensing the liquid polymer. Polymer gel logs require only turbulent contact with the untreated slurry, which is easily provided by simple mechanical mixing. Finally, the mechanical mixer needed for polymer gel logs requires very little maintenance and much less human intervention than the equipment used in a liquid polymer system. It has been discovered that the polymer dissolution of the logs automatically adjusts according to changing flow conditions, thereby requiring only occasional observation and intervention.

Thus, as demonstrated by the deficiencies of the prior art, there is a need identified for a sloped plate water clarifier that has an improved plate arrangement including adjustable plate angles in at least one section for increased control over the settling process. In addition, a better approach for separating and recovering useable process product that is mixed with the untreated slurry has long been sought, but still remains unsolved in so far as I am aware prior to the present invention. Also, a workable mechanical mixer to be used with polymer gel logs to provide cost-effective and more efficient flocculant treatment is desired.

SUMMARY OF THE INVENTION

Accordingly, it is a primary object of the present invention to provide an improved sloped plate water clarifier having features that are designed to overcome limitations of the prior art.

Another object of the present invention is to provide a sloped plate water clarifier having multiple stages of sloped plates that are positioned in series to provide enhanced clarifying efficiency.

It is another object of the present invention to provide a sloped plate water clarifier having at least one group of sloped plates with adjustable angles for improved control over the clarifying process.

It is yet another object of the present invention to provide a sloped plate water clarifier having a static screen that recovers useable product from the untreated slurry before the slurry enters the clarifier tank.

It is still another object of the present invention to provide a sloped plate water clarifier that successfully uses flocculant in the form of polymer gel logs to enhance the settling process and reduce the costs of flocculant treatment.

It is yet another object of the present invention to provide a sloped plate water clarifier having a feeding and mixing passageway that uses rotating drums for providing turbulent contact between the polymer flocculant and the untreated slurry.

Still another object of the present invention is to provide such a water clarifier combined with other features improving its operating efficiency, such as an improved discharge pump for the residue from the clarification operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved multiple stage sloped plate water clarifier is provided that is particularly well-suited for treating slurry or washwater in a quarry or mining operation. The clarifier includes a feeding and mixing passageway that receives the untreated slurry. Chemical flocculant is provided in the passageway to enhance the settling of the suspended solids in the slurry. Preferably, polymer flocculant gel logs are used to provide cost effective and less labor-intensive treatment.

Agitating means in the passageway provide controlled mechanical mixing of the slurry with the flocculant. In the preferred embodiment, one or more rotating drums are used in the passageway and are positioned with their axes of rotation perpendicular to the flow. In an alternate embodiment, a single, large drum rotates about an axis that is parallel to the flow and includes internal cages that hold the flocculant logs for mixing with the untreated slurry. With either embodiment, the controlled mechanical mixing of the water with the polymer flocculant provides superior and low cost flocculation of the suspended solids for improved settling.

The passageway feeds the slurry onto a static screen that is angled downwardly. The screen preferably comprises closely spaced transverse wires that separate the useable process product from the slurry. The separated product slides by gravity over the screen and into a receiver area where it may be recovered. The slurry continues through the screen and is directed by an entry shaft towards the V-shaped floor of the settling or clarifier tank. As the slurry nears the bottom of the tank, a flow current, that is generally U-shaped, is created by the angled floor and directs the slurry to rise in the tank. Open space in the bottom portion of the tank allows initial settling of the heavier suspended solids, with the solids accumulating in a collection area at the bottom of the tank.

As the slurry rises from the bottom of the tank, it contacts a first stage of sloped plates that facilitate the settling of the next larger suspended solids. Preferably, these plates are positioned at an angle of about 40 degrees to the horizontal to provide substantial contact and settling surface area to intercept the rising solids.

Above this first stage is a second stage of plates that are positioned closer together. The closer spacing allows a greater number of plates to be used, and thus provides increased surface area for still greater settling action. In this manner, the medium sized particles in the rising solids are now collected by the second stage of plates. In the preferred embodiment, the second stage is offset to one side of the first stage. This configuration creates eddy currents in the open space above the first stage where some of the lighter solids collect, coalesce and settle.

A third and final stage of sloped plates is positioned above the second stage and provides further settling for the smallest or finer particles of suspended solids. The plates of the third stage are gang mounted on hinges at their bottom end to allow their angle to the horizontal to be adjusted. The adjustable angle allows fine tuning of the final stage in the clarifying process to accommodate changing slurry conditions and flow rates. Preferably, the angle is adjustable from 45–70 degrees to allow for optimal clarification in a wide variety of operating conditions.

Along the exit wall of the settling tank and just above the top edge of the third stage plates is an exit spillway. As the clarified water rises above the third stage plates, it flows over the spillway for collection and re-use or safe discharge. If necessary or desired, the exit spillway may direct the water into a second clarifier for further clarification.

At the bottom of the settling tank a valve is provided to allow the removal of the accumulated solid residue. In an alternate embodiment, a pump operating on the venturi principle may be used to expel the solids. In this system, one or more nozzles are positioned near the bottom of the settling tank in the collection area. The nozzle enters from one side of the tank and directs a high velocity stream or jet of water into a coaxial pipe that exits the other side of the tank. In this manner, suction created by the low pressure boundary layer of the stream draws the accumulated solids into the stream. The entrained solids are then forced out of the tank through the aligned exit pipe.

Still other objects of the present invention will become apparent to those skilled in this art from the following description wherein there is shown and described in a preferred embodiment of this invention, simply by way of illustration of one of the modes as best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

FIG. 1 is a perspective view of a multiple stage sloped plate water clarifier of the present invention showing the clarifier with the near side wall partially cut away to expose the third stage of sloped plates in the clarifier tank.

FIG. 3 is a partial broken away view of the first and second settling stages of sloped plates showing the rising slurry flowing through the channels between adjacent parallel plates.

FIG. 4 is a partial broken away side view of the third settling stage incorporating adjustable plates, and showing by dashed outline and action arrow the movement of the actuator and attached lever that changes the angle of the plates.

FIG. 5 is a perspective view of an alternative embodiment of the feed passageway in which a single, large agitating drum rotates about an axis parallel to the flow of the slurry; the drum including auger flights that help push the slurry to the exit end of the passageway and with compartments containing the polymer gel logs.

FIG. 5a is a cross sectional view of the passageway and drum of the alternative embodiment illustrated in FIG. 5 and taken along line 5a—5a.

FIG. 6 is a cut away view of an alternate approach to residue or sediment removal in which a stream of water from a nozzle is directed into an exit pipe to create a venturi induced suction force that expels said residue from the bottom portion of the tank.

DETAILED DESCRIPTION OF THE INVENTION

Figure 2:
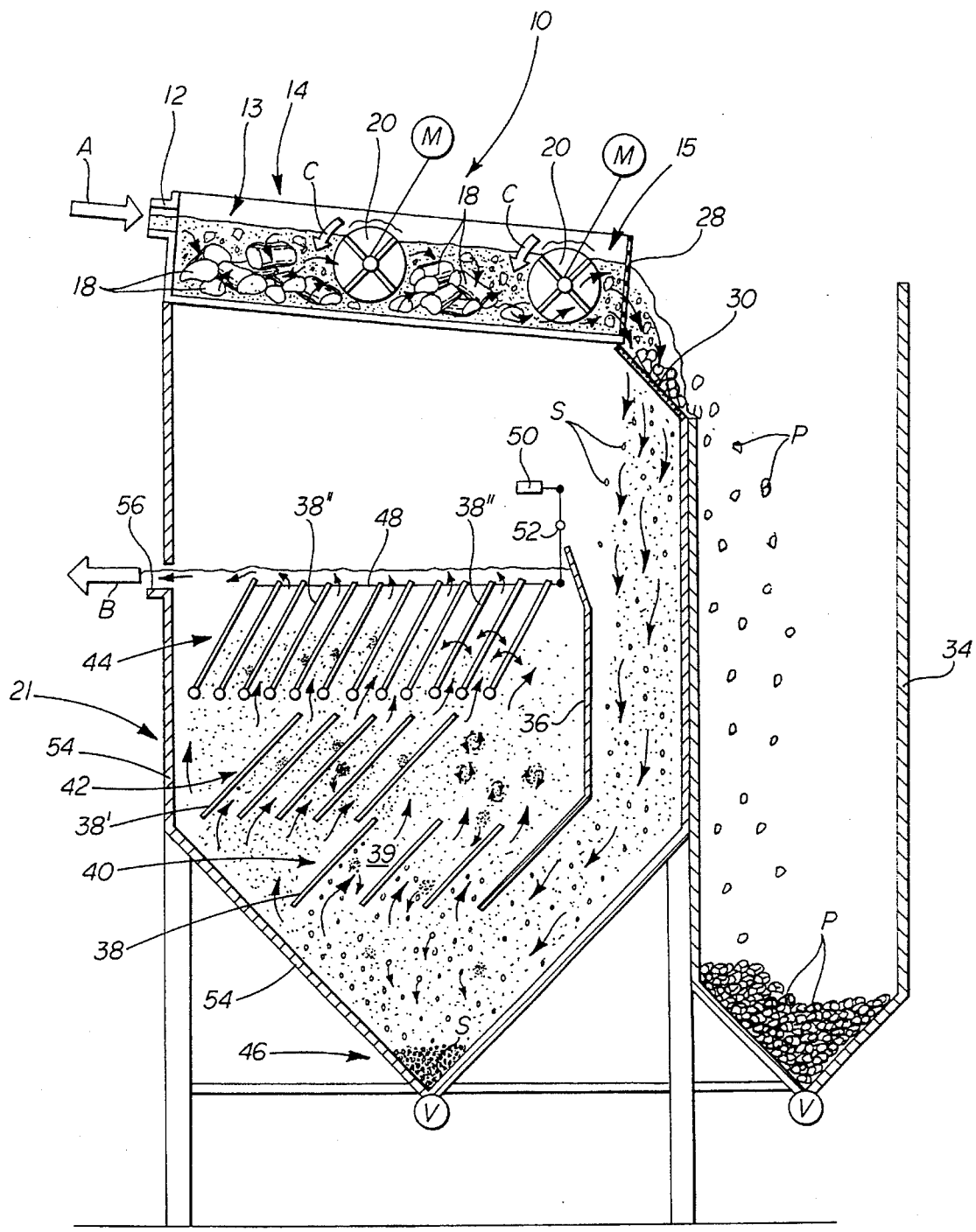
FIG. 2 is a schematic side view of the clarifier in operation showing untreated slurry entering the feeding and mixing passageway, useable process product being separated by the static screen, and illustrating the flow of the slurry through the three settling stages of sloped plates and clarified water being discharged out of the settling tank.

Reference is now made to FIGS. 1 and 2 which show the preferred embodiment of an improved multiple stage water clarifier according to the present invention, and generally represented by the reference numeral 10. The clarifier 10 is particularly adapted for treating process washwater, such as in a quarry or mining operation.

As shown in these figures, untreated slurry is introduced through an entry pipe 12 into a feeding and mixing passageway 14. In the preferred embodiment, the passageway 14 is inclined and has entry and exit sections 13, 15. The entry section 13 is elevated above the exit section 15 to allow the slurry to flow by gravity feed to the exit section 15. As described in more detail below, from the exit section 15 the slurry falls through a static screen 30 and into a settling tank 21.

As shown in FIG. 2, polymer flocculant gel logs 18 are placed in the passageway 14 to assist the suspended solids in the slurry to agglomerate into heavier masses for improved settling. Using this solidified form of polymer flocculant in the clarifier 10 of the present invention provides several distinct advantages over the liquid-form polymer flocculant that is used in the prior art clarifiers. Most significantly, it has been found that the water clarifier 10 uses significantly less polymer flocculant as compared to a similar clarifier using liquid polymer. As polymer flocculant is the most expensive component of a clarification system, this results in dramatically lower treatment costs as compared to liquid polymer clarifiers. In addition, the clarifier 10 does not need the separate storage tanks and pumping stations that are required for liquid polymer. Thus, the clarifier 10 of the present invention is not only much less expensive to manufacture, but also provides significant increases in settling efficiency and attendant cost savings realized from a reduction in the amount of flocculant that it uses.

As illustrated in FIGS. 1 and 2, mechanical mixing of the polymer gel logs 18 with the slurry is provided by two paddle wheel-type agitating drums 20. In the preferred embodiment, both of the drums 20 are positioned with their axes of rotation perpendicular to the flow of the slurry. The drums 20 rotate in the direction of action arrows C (counterclockwise when viewed in FIG. 2). The induced flow over the top of the drums 20 generated by the paddles against the gravity flow of the slurry provides superior mixing of the slurry with the polymer flocculant. Each drum 20 also has spaced dividers to facilitate a more effective mixing action. These features allow the slurry to flow under, as well as retro flow over the drum, as it bodily moves toward the exit section 15. The drums 20 are each powered by a separate motor M. If desired, variable speed motors, and an electronic controller (not shown) can be used to provide additional control over the mixing process.

In an alternative embodiment shown in FIGS. 5 and 5a, a single agitating drum 22 is provided that rotates about the longitudinal axis of the slurry flow in a modified curved passageway 14'. The drum 22 is driven by a variable speed motor $M_1$ and includes auger flights 24 supported on a drive shaft and dual end spoked wheel assembly 24a. The flights 24 extend outwardly in a helical or corkscrew fashion continuously along the length of the drum 22. As the drum 22 rotates in the direction of action arrow D, the flights 24 push the slurry along the passageway 14' towards the exit section 15.

Within the profile of the drum 22 are elongated curved blades 25 with retention cages 26 mounted thereon that form the compartments to hold the polymer gel logs 18 for a superior mixing action. The cages 26 can be of any suitable construction, such as coated wire mesh, that allows substantially full surface contact between the logs 18 and the slurry. Such a wire cylinder may have a pivotal/lockable section (see FIG. 5a) that can be opened for replacement of the logs at regular intervals. The curved blades 25 help stir the slurry, lifting it up and over the logs 18, as well as providing increased general agitation thereof.

With either of the above embodiments, controlled mechanical mixing of the slurry with the polymer flocculant is provided before the slurry enters the settling tank 21. Advantageously, this provides superior flocculation of the suspended solids and facilitates rapid and efficient collection of the solids in the settling tank 21.

As the slurry reaches the exit section 15 it flows through a protective screen 28 and onto a static screen 30. The protective screen 28 prevents any large fragments of polymer gel, large stones or boulders or other foreign objects from falling onto and damaging the static screen 30. As shown in FIG. 1, the static screen 30 is constructed of a rectangular framework of parallel wires 32 that are strung so as to be closely positioned together. Preferably, adjacent wires are spaced 1–2 millimeters apart to allow the slurry to pass through while filtering out the larger pieces of process product P, which may be useful to recover. With the fines so separated by the slurry passing through the screen 30, the product P can be used, for example, in an asphalt mixture for paving. As illustrated in FIG. 2, the separated product P tumble down the angled screen 30 and into an adjacent retainer area of a retention bin 34.

Thus, the static screen 30 allows advantageous recovery of valuable, useful process product P that would otherwise be collected in the settling tank 21 and discarded with the other suspended solids. In a quarry operation, for example, many tons of usable stone have previously been left in the discarded solid residue and fines after the stone washing process. Advantageously, the recovery of this product by deflection over the static screen 30 of the present invention avoids this unnecessary waste.

As the slurry flows through the static screen 30, it enters a substantially vertical entry shaft that is defined on one side by a partition 36 and on the other three sides by the walls of the settling tank 21. As shown in FIG. 2, the settling tank 21 has a V-shaped bottom portion 46 (V-shaped in cross section) that deflects the slurry flow upwardly. In this manner, a generally U-shaped current is created in the bottom portion 46 that assists the slurry to flow upwardly and contact the ascending groups of sloped plates. Additionally, open space in the bottom portion 46 of the tank 21 allows the heaviest of the suspended solids to immediately settle to the collection area of the settling tank 21.

As the slurry rises from the bottom portion 46 of the settling tank 21, it flows through a series of baffle means or sloped plates 38 that define a first clarifying stage, generally designated by the reference numeral 40. These plates 38 are widely spaced apart and extend from wall to wall inside the clarifier tank 21. The plates 38 are positioned parallel to one another and affixed at an angle to the horizontal of between 45-70 degrees; the angle being dependent on the nature of the slurry being handled and upon the amount of clarification desired. Preferably, a 40 degree angle of slope is used to provide a more direct contact surface for the rising slurry. As illustrated in FIGS. 2 and 3, angled flow channels 39 are created between the parallel plates 38. As the slurry flows into the channels 39, the suspended solids or fines in the slurry make contact with the plates 38, and coalesce into larger masses settling onto the plates and eventually falling to the bottom of the tank 21. The remaining lighter solids or fines flow through the channels 39 and continue to rise.

As best seen in FIG. 2, the second clarifying stage 42 is positioned above the first stage 40 and is offset in the direction of the tank exit wall 54. With this configuration, these lighter suspended solids that pass through the first stage 40 bypass the second stage 42 and rise directly into the third stage 44. The U-shaped current near the bottom portion 46 of the tank 21 carries some of the remaining suspended solids under the first stage 40 and into the second stage 42. In the preferred embodiment, the plates 38' of the second stage 42 are spaced closer together to provide increased surface area for greater settling action. As with the first clarifying stage 40, particles of suspended solids or fines gradually accumulate into masses on the plates 38' and eventually fall to the collection areas on the bottom portion 46 of the tank 21. Other fines caught in eddy current flow to one side of the second stage are coalesced as the particles are forced together in the tightly swirling water, and thus tend to settle on their own and fall directly to the collection area.

Located above the second clarifying stage 42 is a third stage 44 for gathering the remaining particles of suspended solids/fines. In an important aspect of the present invention, the angle of the plates 38" in the stage 44 is adjustable to provide further enhanced control over this final stage of the settling process. As shown in FIGS. 2 and 4, the plates 38" are gang hinged at their bottom end and are attached to a longitudinally extending rod 48. An actuator 50 and a pivoting lever 52 complete the linkage and allow the angle of the plates 38" to be adjusted from a remote location. Any suitable means can serve as the actuator 50, such as an electrically operated jack screw. Preferably, the actuator 50 has a displacement that is sufficient to provide angles ranging from 45-70 degrees to allow for optimal clarification in a wide variety of operating conditions.

As the clarified water rises above the third clarifying stage 44, it flows toward the tank exit wall 54 and over a spillway 56 where it can be collected for reuse, or safely discharged into a stream. In situations involving a high concentration of suspended solids, the spillway 56 can direct the water into a second clarifier for further clarification.

In the bottom portion 46 of the clarifier tank 21, means are provided for removing the accumulated solid refuse. As shown in FIG. 2, the preferred embodiment uses a standard butterfly valve V to periodically drain the solids from the tank 21. However, it should be understood that the broader principles of the present invention encompass various other means for expelling the accumulated solids. As shown in FIG. 6, in one alternative embodiment a venturi pump comprising a nozzle 56 directing a stream or jet of water into an exit pipe 58 creates a suction force that draws the solids out of the tank 21 and through the exit pipe 58. Advantageously, the positive suction force created in the boundary layer of the high velocity stream provides for faster and more efficient expulsion of the accumulated solid refuse.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, in the second clarifying stage 42, additional sloped plates 38' may be added above the first clarifying stage 40 such that all of the slurry passes through the second stage 42. The preferred embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A multiple stage water clarifier primarily for separating, settling and collecting suspended solids from substantially continuously flowing process washwater slurry, comprising:

a feeding and mixing passageway for receiving and agitating said slurry;

means for flocculating said slurry in said passageway;

a settling tank receiving the slurry from said passageway, said slurry being mixed with said flocculating means;

means for directing said slurry from said passageway adjacent the top toward the bottom portion in a downflow area and back to the top portion of said setting tank in an upflow area;

at least first and second baffle means inside said upflow area and vertically separated from bottom to top in the flow direction, each baffle means comprising a plurality of spaced apart plates; and means for discharging the accumulation of said solids from the bottom portion of said settling tank.

2. The water clarifier as set forth in claim 1, wherein said feeding and mixing passageway comprises an inclined passageway having an entry section for receiving said slurry and an exit section for directing said slurry into said settling tank.

3. The water clarifier as set forth in claim 1, wherein said flocculant means comprises spaced apart polymer gel logs.

4. The water clarifier as set forth in claim 1, wherein said passageway includes at least one independently powered agitating drum having a discontinuous surface for mechanically mixing said slurry with said flocculating means, whereby the turbulent contact between said slurry and said flocculating means improves the settling of said suspended solids.

5. The water clarifier as set forth in claim 4, wherein said at least one agitating drum rotates about an axis that is perpendicular to the flow of said slurry.

6. The water clarifier as set forth in claim 4, wherein said at least one agitating drum rotates about an axis that is parallel to the flow of said slurry and includes auger flights that assist in directing said slurry to said exit section of said passageway.

7. The water clarifier as set forth in claim 6, wherein said at least one agitating drum includes internal retention cages for holding said flocculant as said drum rotates in said slurry flow to provide an improved mixing action.

8. The water clarifier as set forth in claim 1, further including a static screen positioned between said passageway and said tank for separating process product from said slurry.

9. The water clarifier as set forth in claim 8, wherein said static screen comprises a plurality of parallel tensioned wires spaced so as to separate said process product from said slurry, said wires being angled downwardly to allow said process product to slide off said screen and into a receiver adjacent to said settling tank.

10. The water clarifier as set forth in claim 1, wherein said first baffle means define a first clarifying stage comprising a plurality of parallel and spaced apart plates being positioned at an angle to the horizontal of 45–70 degrees.

11. The water clarifier as set forth in claim 10, wherein said second baffle means define a second clarifying stage being above said first stage and comprising a plurality of parallel and spaced apart plates being positioned at an angle to the horizontal of 45–70 degrees.

12. The water clarifier as set forth in claim 11, wherein a third baffle means define a third clarifying stage being above said second stage and comprising a plurality of parallel and spaced apart plates being adjustable to an angle to the horizontal of 45–70 degrees.

13. The water clarifier as set forth in claim 1, wherein said means for discharging comprises:

at least one nozzle extending into said bottom portion of said settling tank; and an exit pipe being positioned in front of said nozzle and extending out from said bottom portion;

whereby a stream of water directed from said nozzle into said exit pipe creates a suction force in the boundary layer that pulls said accumulated solids out from said bottom portion.

14. A multiple stage water clarifier primarily for separating, settling and collecting suspended solids from substantially continuously flowing process washwater slurry, comprising:

a settling tank having first and second sides;

a feeding and mixing passageway above said settling tank, said passageway extending substantially from said first side to said second side of said tank, said passageway for receiving and agitating said slurry;

means for flocculating said slurry in said passageway;

wherein said slurry exits said passageway and flows downwardly into said tank along said second side and towards said bottom portion of said tank, said bottom portion directing said slurry around a partition and then upwardly along said first side to create a U-shaped retro-flow current within said slurry;

at least first and second baffle means comprising a plurality of spaced apart plates inside said settling tank between said partition and said first side; and means for discharging the accumulation of said solids from the bottom portion of said settling tank.

15. The water clarifier as set forth in claim 14, wherein said first and second baffle means are vertically separated from bottom to top within said settling tank.

16. A multiple stage water clarifier primarily for separating, settling and collecting suspended solids from substantially continuously flowing process washwater slurry, comprising:

a feeding and mixing passageway for receiving and agitating said slurry;

at least one independently powered agitator for mechanically mixing said slurry with said flocculating means;

said agitator rotating about an axis that is parallel to the flow of said slurry and including open auger flights that contact said slurry only along the peripheral edges of said passageway;

means for flocculating said slurry in said passageway;

a settling tank below said passageway receiving the slurry from said passageway, said slurry being mixed with said flocculating means;

said settling tank comprising a downflow area receiving said slurry, a partition and an upflow area;

at least first and second baffle means comprising a plurality of spaced apart plates inside said upflow area, said baffle means being vertically separated from bottom to top in the flow direction; and means for discharging the accumulation of said solids from the bottom portion of said settling tank.

17. The water clarifier as set forth in claim 16, wherein said agitator includes a cage internal to said auger flights, said cage containing a polymer gel log flocculent that rotates with said agitator to mix with said slurry.

* * * * *